US006035290A

United States Patent [19]
Pintsov

[11] Patent Number: 6,035,290
[45] Date of Patent: Mar. 7, 2000

[54] METHOD FOR ENHANCING SECURITY AND FOR AUDIT AND CONTROL OF A CRYPTOGRAPHIC VERIFIER

[75] Inventor: Leon A. Pintsov, West Hartford, Conn.

[73] Assignee: Pitney Bowes Inc., Stamford, Conn.

[21] Appl. No.: 08/911,856

[22] Filed: Aug. 15, 1997

[51] Int. Cl.[7] .................................................... G06F 12/16
[52] U.S. Cl. ............................................................ 705/405
[58] Field of Search .................................... 705/405, 400, 705/7, 1, 11, 27, 401, 402, 404, 410; 702/27, 179; 377/13, 15, 16

[56] References Cited

U.S. PATENT DOCUMENTS

| | | | |
|---|---|---|---|
| 3,988,570 | 10/1976 | Murphy et al. | 705/11 |
| 4,097,923 | 6/1978 | Eckert, Jr. et al. | 705/403 |
| 4,725,718 | 2/1988 | Sansone et al. | 235/495 |
| 4,757,537 | 7/1988 | Edelmann et al. | 380/51 |
| 4,775,246 | 10/1988 | Edelmann et al. | 380/23 |
| 4,796,193 | 1/1989 | Pitchenik | 705/408 |
| 4,831,555 | 5/1989 | Sansone et al. | 705/408 |
| 4,873,645 | 10/1989 | Hunter et al. | 364/479.01 |
| 5,293,319 | 3/1994 | DeSha et al. | 705/408 |
| 5,835,689 | 11/1998 | Braun et al. | 705/405 |

*Primary Examiner*—Emanuel Todd Voeltz
*Assistant Examiner*—Thomas A. Dixon
*Attorney, Agent, or Firm*—Kimberly S. Chotkoswki; Steven J. Shapiro; Michael E. Melton

[57] ABSTRACT

A cryptographic method where items, such as mail pieces, are verified for authenticity includes determining a predetermined number of items selected for verification during a given period and maintaining a count of the number of items verified. The predetermined number is compared with the number of items verified. The verification process may continue if a match occurs and may be stopped if a match does not occur. The verifier includes means for inputting data relating to an item to be verified and access counter means for counting the number of items verified.

16 Claims, 6 Drawing Sheets

METHOD FOR ENHANCING SECURITY AND FOR AUDIT AND CONTROL OF A CRYPTOGRAPHIC VERIFIER

FIELD OF THE INVENTION

The present invention relates to cryptographic techniques and systems for enhancing security and for verifying evidence of authenticity or of payment. More particularly, the present invention relates to mail processing cryptographic techniques and systems for validation of mailpieces having printed cryptographic evidence of postage payment and for enhancing revenue collection security.

BACKGROUND OF THE INVENTION

In mail preparation, a mailer prepares a mailpiece or a series of mailpieces for delivery to a recipient by a carrier service such as the United States Postal Service or other postal service or private carrier delivery service. The carrier services, upon receiving or accepting a mailpiece or a series of mailpieces from a mailer, processes the mailpiece to prepare it for physical delivery to the recipient. Part of the carrier service processing includes reading the addresses on the mailpieces, sorting the mailpieces for delivery and determining that carrier service charges have been paid by the mailer.

The mail preparation function has included rating and postage payment. Postage payment systems have been developed employing postage meters, which are mass produced devices for printing a defined unit value for governmental (such as tax stamps, or postage stamp) or private carrier delivery of parcels and envelopes. These postage meter systems involve both prepayment of postal charges by the mailer (prior to postage value imprinting) and post payment of postal charges by the mailer (subsequent to postage value imprinting). Postal charges (or other terms referring to postal) as used herein should be understood to mean charges for either postal tax, or private carrier charges or other value printing, as the case may be.

Postage metering systems have been developed which employ encrypted information on a mailpiece. The postage value for a mailpiece may be encrypted together with other data to generate a digital token. A digital token is encrypted information that authenticates the information imprinted on a mailpiece such as postage value. Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 15, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,873,645 for SECURE POSTAGE DISPENSING SYSTEM issued Oct. 10, 1989 and, U.S. Pat. No. 4,725,718 for POSTAGE AND MAILING INFORMATION APPLYING SYSTEMS, issued Feb. 16, 1988. These systems, which may utilize a device termed a Postage Evidencing Device (PED), employ an encryption algorithm which is utilized to encrypt selected information to generate the digital token. The encryption of the information provides security to prevent altering of the printed information in a manner such that any change in a postal revenue block is detectable by appropriate verification procedures.

Encryption systems have also been proposed where accounting for postage payment occurs at a time subsequent to the printing of postage. Systems of this type are disclosed in U.S. Pat. No. 4,796,193 for POSTAGE PAYMENT SYSTEM FOR ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED, issued Jan. 3, 1989; U.S. Pat. No. 5,293,319 for POSTAGE METERING SYSTEM, issued Mar. 8, 1994; and, U.S. patent application Ser. No. 882,871, for POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF POSTAGE filed Jul. 7, 1986 by Wojciech M. Chrosny and assigned to Pitney Bowes, Inc., or its Canadian Counterpart patent No. 1 301 336.

The advantages of digital (bit-map) printing of the postal and other proofs of payment are well known. The security of such proofs are based on printing pseudo-random (and hence unpredictable for the intruder) information within the indicium. This is done by using modern information security methods such as cryptographic digital signatures or message authentication codes. The integrity of the payment system critically depends on the verification of the proof of payment by the verification authority.

The use of digital tokens (one or several digit truncations of message authentication code computed using a symmetric key cryptographic algorithm) as pseudo random information in the indicium is also well known. The use of single digit tokens is particularly advantageous since it minimizes the amount of information which must be printed in the indicium while providing adequate security protection.

The verification of the indicium containing digital tokens requires entry of the information from the indicium into a verification computing device (also known as a verifier). The verifier executes digital token transformation and compares the printed and computed digital tokens in order to authenticate the indicium, then the verifier checks the integrity of the printed information and ultimately verifies the proof of payment. The mismatch of computed and printed tokens is indicative of the counterfeited indicium. The verifier stores relevant secret cryptographic keys in a tamper resistant and tamper detectable manner.

One potentially undetectable and harmful attack against the digital token indicium which has been noted is the fraudulent misuse of the verifier as an oracle capable of predicting correct digital tokens for any combination of indicia parameters. The attack is particularly effective against one or two digit tokens and rapidly diminish in effectiveness with larger number of digits in the token. The attacker programs a computer to enter valid combinations of input parameters into the verifier. Such combination contains meter ID, date, postage amount, postal code of registration postal office and randomly selected digital token. The combination is valid in the sense that all parameters are properly formatted and the meter ID is taken from the lists of valid meter IDs. The verifier then responds with a "yes" or "no" answer to each valid combination. The attacker records all combinations which produced a "yes" answer and then uses them in printing indicia which will be, in principle, indistinguishable from legitimately paid indicia.

For a single digit token, the attacker on average has to try only five combinations of parameters to arrive at usable "yes" combination due to the uniform distribution of token digit. For the two digit token the average number of trials is 50. Since the digital token transformation based on a strong symmetric cryptographic algorithm such as triple DES takes only, for example, 10 milli seconds to execute, an attacker in a short period of time can obtain information for many fraudulent indicia. Even in a controllable and secure environment, such as a Postal verification facility, it is difficult to maintain continuous observation of potentially multiple verifiers. Since the attack is undetectable on the mailpiece/indicium level and, moreover, can be implemented by unscrupulous verification personnel when appropriate security procedures are not in place and followed. Therefore, it is very desirable to find a method and system for a reliable detection of the fraudulent misuse of the verifier in the oracle mode.

SUMMARY OF THE INVENTION

It is an object of the present invention to enhance the security of a cryptographic system.

It is yet another object of the present invention to render a detectable verifier attack on a cryptographic system.

It has been discovered by determining the number of items expected to be verified and counting the number of items actually verified that the cryptographic security of a system such as a mailing system, can be enhanced.

In accordance with the present invention, a cryptographic method where items are verified for authenticity embodying the present invention includes determining a predetermined number of items selected for verification during a given period and maintaining a count of the number of items verified. The predetermined number is compared with the number of items verified.

In accordance with a feature of the present invention, the verification process continues if a match occurs. Alternatively, the verification process is disabled if a match does not occur or after a predetermined number of verifications.

A verifier embodying the present invention includes a means for imputing data relating to an item to be verified. Access counter means count the number of items verified.

BRIEF SUMMARY OF THE DRAWINGS

Reference is now made to the following figures wherein like reference numerals designate similar elements in the various views and in which.

DETAILED DESCRIPTION OF THE PREFERRED EMBODIMENT

General Overview

Figure 1:
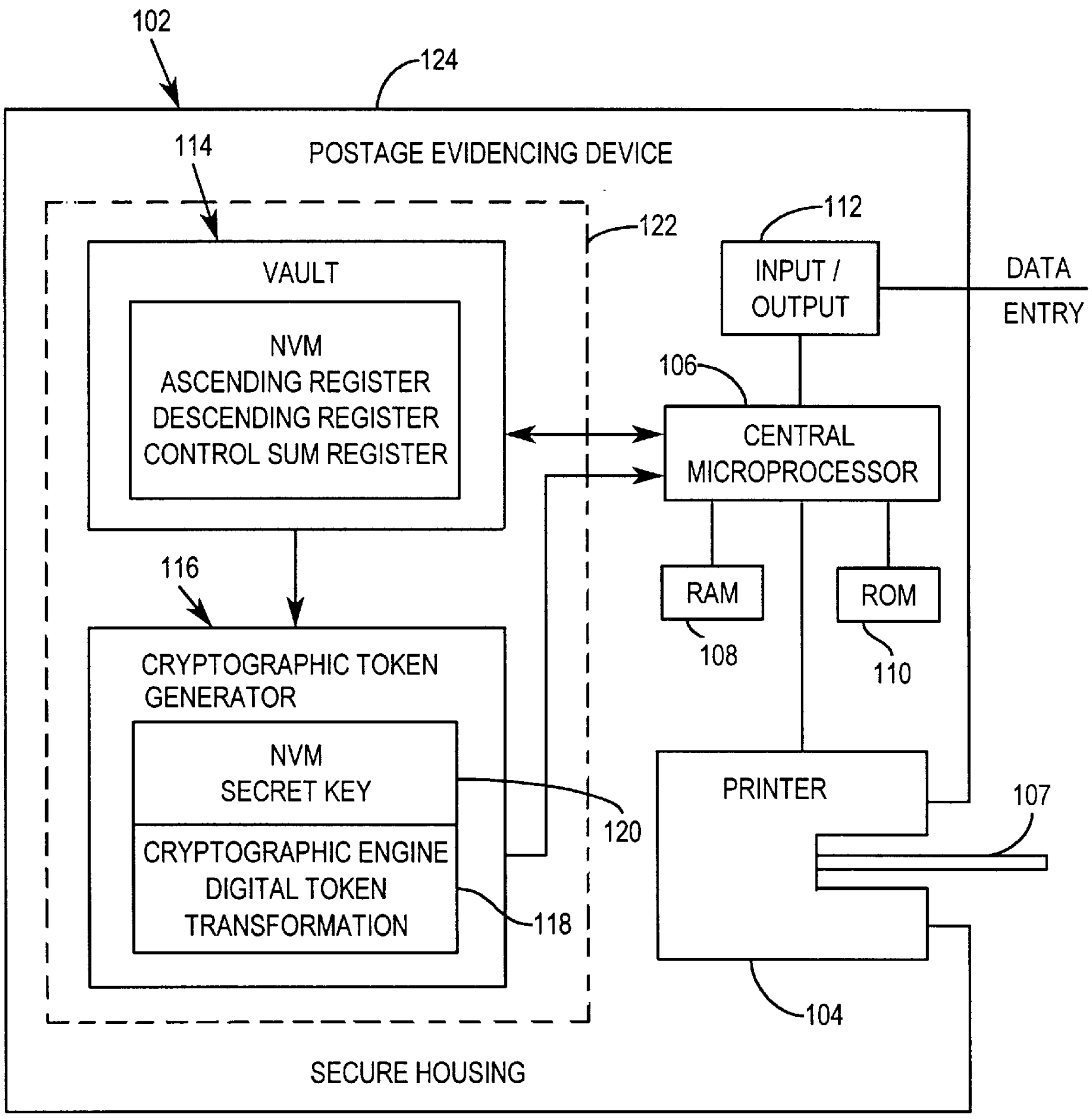
FIG . 1 ( PRIOR ART )
FIG. 1 is a block diagram of a postage evidencing device suitable for use with the present invention.

It has been discovered that the verifier in its architecture and operation is very similar to metering systems such as a postage evidencing device. Both may employ cryptographic digital token transformation using secret key. In the postage evidencing device, every access to the secret key invokes an accounting action. In the most common form this accounting action is a subtraction of the requested postage amount from the descending register. Similarly, it has been discovered that every access to the secret key in the verifier can be reliably accounted for in a manner which enhances systems security. This may be organized in hardware with the use of a secure access or usage counter. The data from the counter is securely stored in nonvolatile memory of the verifier.

When verification is done in the verification facility, the number of indicia which need to be verified is determined based on the overall revenue protection targets and should always be known in advance. For example, if a given postal facility processes on average 2 million mail pieces a day, and if it employs 4 verifiers and if every one out of a hundred mail pieces is selected for indicium verification (i.e. the selected sampling rate is 1%), then total number of mail pieces selected for verification per day is 20,000. This means that each of the four verifiers will on average process 5,000 pieces per day.

The misuse of the verifier as an oracle will produce on average five times more accesses to the secret keys than the 5,000 allowed accesses. For instance, if an unscrupulous verification clerk or another person who has access to the verifier wants to steal $320 worth of postage (equivalent to sending 1,000 mail pieces without paying postage), such a person on average would have to mount 5,000 accesses to the secret keys in the verifier. This will double the value of access counter in the protected memory location from 5,000 to 10,000, and thus can be easily detectable during an audit process. This process can be done remotely which makes it particularly effective. Thus, any attempt of significant fraud becomes easily detectable.

Another method of using the same approach allows effective prevention (as opposed to detection) of misuse of the verifier. In particular, the access counter value can disable the use of the verifier after a predetermined value is loaded into the access counter. For example, at the beginning of the working day a system administrator will set up all verifiers access counter values to a predetermined number. In the example above, for instance, it may be 5,000+100 where 100 may represent a margin for error in estimation of the number of pieces that need to be verified during the day. Alternatively, the administrator may set it up at exactly 5,000 and then reset it to a higher value later in the day, when the number of additional pieces become known. In either case, the use of the verifier is limited to a legitimate authorized process.

It was also discovered that the utilization of verifiers with protected usage or access counters can be gainfully employed to monitor effectiveness of the overall revenue protection measures for postage evidencing devices. In particular, since every legitimate access to the secret key in the postage evidencing device must be matched by the similar access in the verifier(assuming 100% sampling), the total number of accesses in mailer's systems (which can be obtained from the records of computer meter resetting systems) and the total number (or a predetermined fraction thereof) of accesses resulted in "yes" responses from verifiers must be strongly correlated if there is no leakage in the overall system. Such correlation measure can provide a strong evidence of the absence or presence of significant fraud in the system. Moreover, this correlation measure as an indicator of fraud can be computed automatically using remotely accessible data, making the system particularly effective.

Organization And Operation Of The System

Reference is now made to FIG. 1. A Postage evidencing device shown generally at 102 includes a printer 104 adapted to print information on mail pieces such as mail piece 107. The printer imprints an indicia which may include a cryptographic token providing evidence of the authenticity of the imprint as noted in the above referenced patents.

The printer 104 is connected to a central processor or micro processor 106. The micro processor 106 includes a random access memory (RAM) 108 and a read only memory (ROM) 110. The ROM includes a program to operate the postage evidencing device 102. The micro processor 106 is further connected to an input/output module 112 for the input and output of various data and information. A vault shown generally at 114 includes a nonvolatile memory (NVM) 120. The nonvolatile memory may be partitioned to have an ascending register, a descending register and a control sum register. Critical accounting data is stored in these registers relevant to the operation of the postage evidencing device 102. The vault 114 is connected to a cryptographic token generator shown generally at 116. The cryptographic token generator 116 includes a cryptographic engine 118, a nonvolatile memory 120 having secret key data stored therein and includes a digital token transformation. The cryptographic engine 118, using the secret key, performs a digital token transformation to generate digital tokens which are communicated to the micro processor 106 for imprinting on the mail piece 107.

The vault 114 and cryptographic engine 116 may each be in a secure housing. Both of these units may be also housed within a second secure housing 122 to preclude access to the communication link between the vault 114 and the cryptographic engine 116. The entire postage evidencing device may also be in yet another outer secure housing 124.

Figure 2:
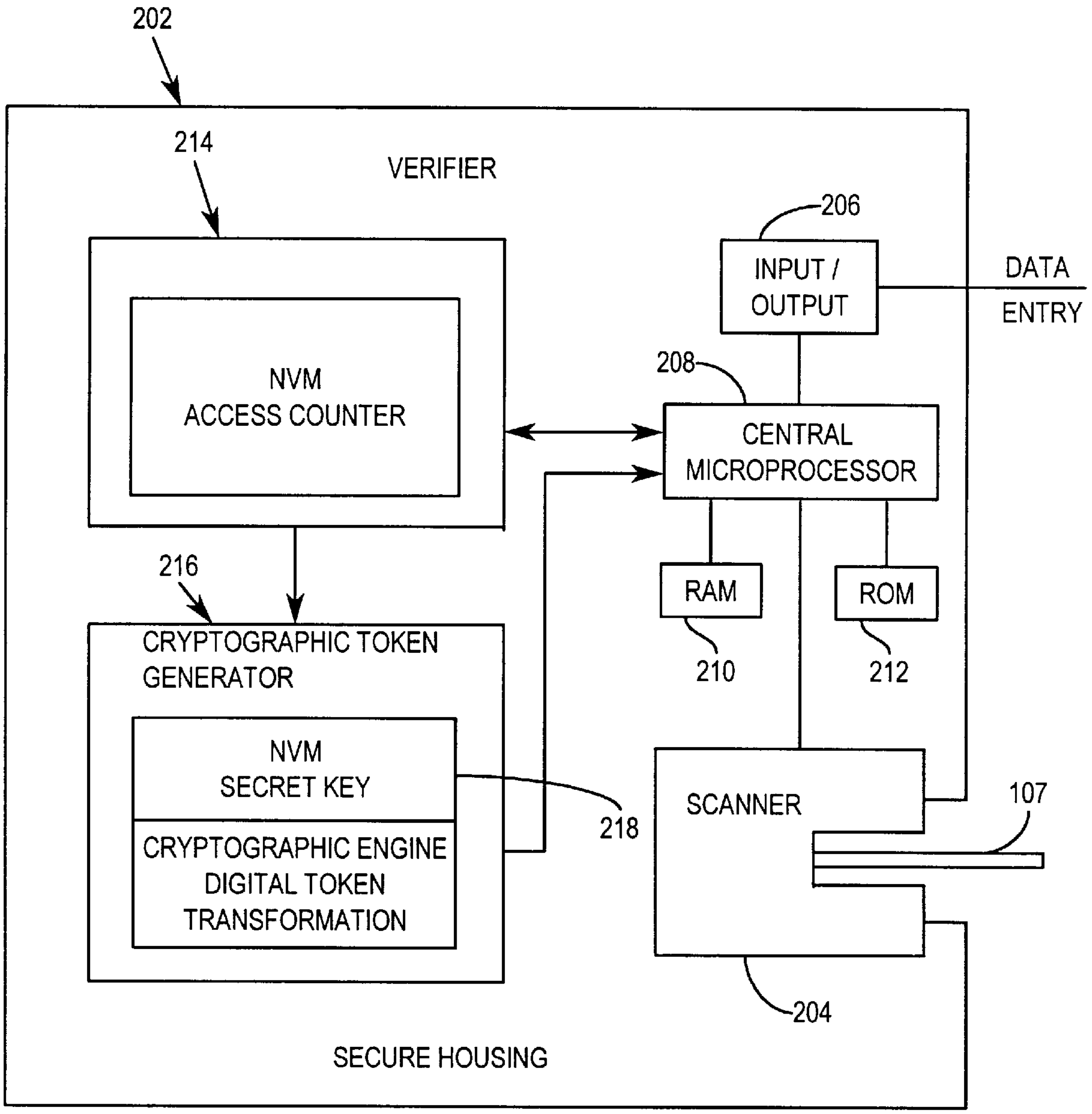
FIG. 2 is a block diagram of a cryptographic verifier embodying the present invention.

Reference is now made to FIG. 2. A verifier shown generally at 202 includes a scanner 204. The scanner 204 scans information printed on mail pieces such as mail piece 107. Mail piece 107 may be imprinted by imprinter 104 shown in FIG. 1 or other suitable unit value printer that prints a digital or other token useful in validating the imprint. It should be noted that the scanner may be mounted external to the verifier and not be within any secure housing of the verifier with the information being communication through a communication link to the verifier. This information can be communicated via the data entry connection and the input/output module 206 coupled to the microprocessor or central processor 208.

The central processor 208 has a random access memory (RAM) 210 and a read only memory (ROM) 212. The central processor is connected to access counter 214. The access counter contains nonvolatile memory for nonvolatile storage of access related and other data. A cryptographic engine shown generally at 216 includes a nonvolatile memory 218 containing secret key data. This secret key data may, for example, be a data of secret key for a plurality of meters. The specific need key may be retrieved based on meter identification data input to the verifier such as from scanning a mail piece. This data base in one embodiment may be internal to the verifier and stored in the nonvolatile memory. In an alternative embodiment, the data of secret meter keys may be external to the verifier and securely communicated to the verifier. This secure communication can be achieved by employing a secret key stored in the verifier. The cryptographic engine provides a digital token transformation process that corresponds to cryptographic engine 118. The token transformation may be identical to that of the postage evidencing device. This is to enable the verification of the digital tokens on the mail piece.

It should be specifically recognized that many various organizations and architectures for the postage evidencing device shown in FIG. 1 and the verifier shown in FIG. 2 are suitable for use with the present invention. For example, the printer 104 may be a general purpose printer external to the postage evidencing device and coupled to the postal evidencing device. Alternatively, the printer can be part of the secure housing of the postage evidencing device. Various alternative forms for the cryptographic techniques and technologies may be employed in both the postage evidencing device and the verifier. Both the verifier and the postage evidencing device may have key boards and displays of all various forms and types for entering and displaying relevant data. Modems or other remote communications capabilities may be provided.

Figure 3:
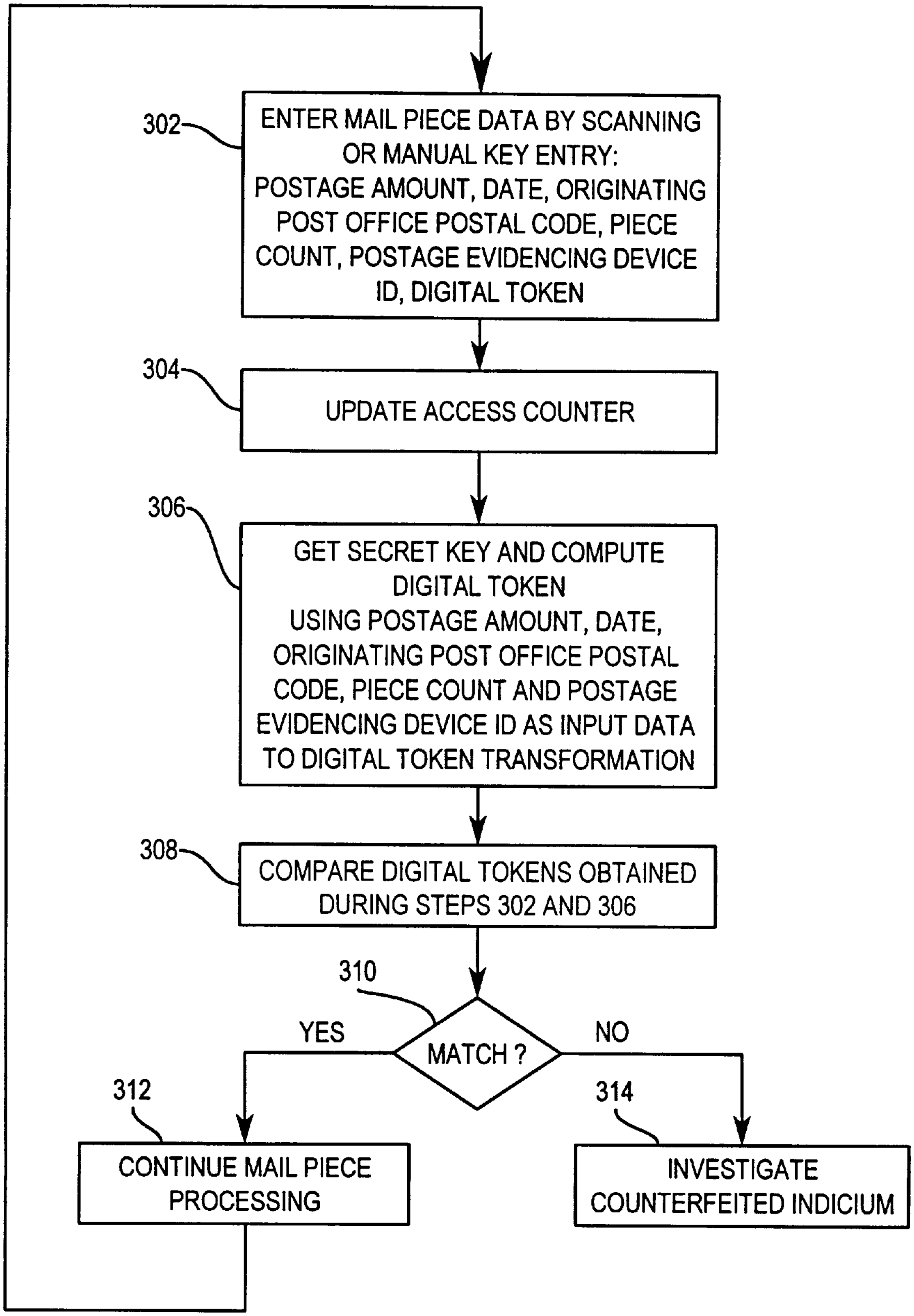
FIG. 3 is a flow chart of the operation of the verifier shown in FIG. 2.

Reference is now made to FIG. 3. Mail piece data is entered into the verifier by scanning or manual key entry at 302. This data can be, for example, postage amount, date, originating post office, postal code, piece count, postage evidencing device I.D., and digital token. The particular data scanned or entered manually via the key board depends on the particular cryptographic system being employed.

The verifier access counter is updated at 304 to reflect the verification process being performed at 302. The secret key is obtained and the digital token is computed at 306. This uses the similar type of data entered and identical token transformation as used in imprinting the mail piece. The digital token is computed using the postage amount, date, originating post office, postal code, piece count and postage evidencing device I.D. as input data to the digital token transformation. This is data which is obtained from the mail piece. The digital token obtained during the scanning or manual key entry is compared with the computed digital token at 308. A determination is made at 310 whether the computer digital token and the entered digital token or scanned digital token match. If the tokens match, the mail piece processing continues at 312. If the tokens do not match, investigation is initiated at 314 to determine whether a mail piece with counterfeit indicium has been detected.

Figure 4:
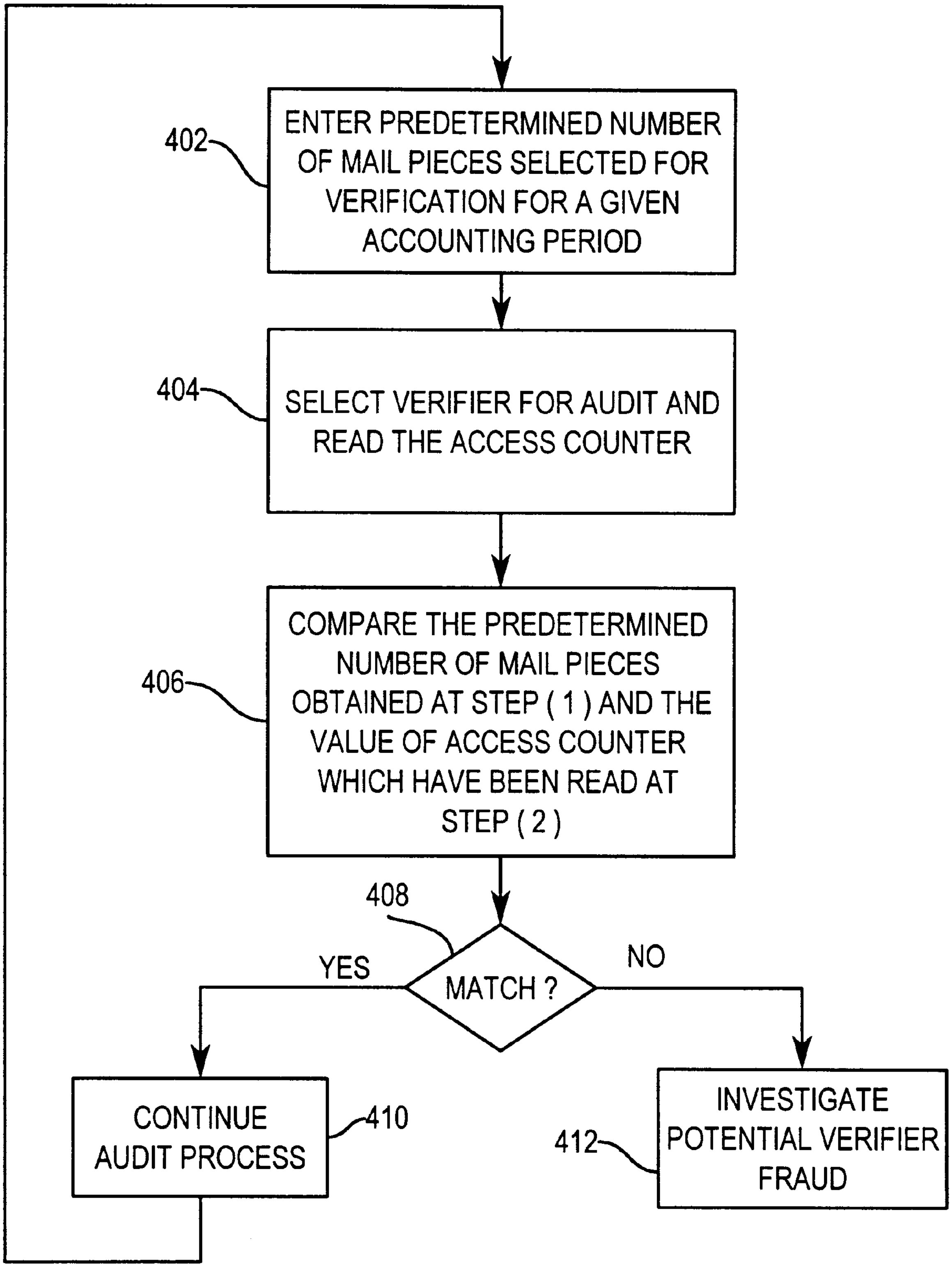
FIG. 4 is a flow chart of the verifier audit process of the verifier shown in FIG. 2 to detect verifier misuse.

Reference is now made to FIG. 4. A predetermined number of mail pieces selected for verification for a given accounting period is entered at 402. The verifier access counter is selected and read for audit purposes at 404. A comparison is made at 406 of the predetermined number of mail pieces and the value of the access counter. This is to determine whether the predetermined number of mail pieces selected for verification during a given accounting period matches with the use of the verifier. The matching determination is made at 408. If a match occurs, the audit process continues at 410. If a match does not occur, a potential verifier fraud is initiated and investigated at 412. It should be recognized that a match includes a range of use of the verifier which is beyond a certain limit which would initiate an investigation. Thus, the threshold, when an investigation is initiated at 412, is set by a security standard for the determination of when a match occurs or has not occurred based on the use of the verifier.

Figure 5:
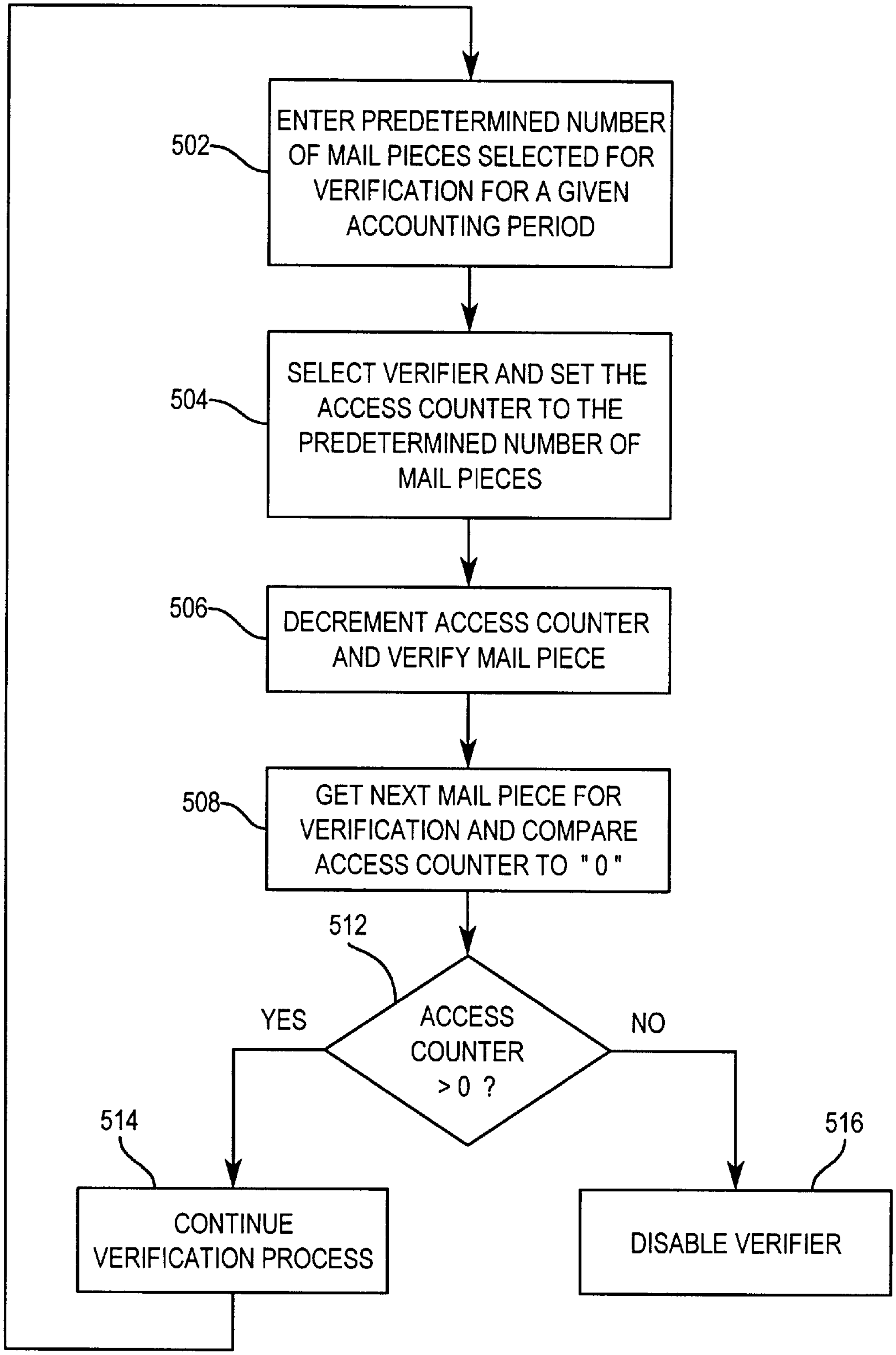
FIG. 5 is a flow chart of the operation of the verifier shown in FIG. 2 to disable the verifier operation after access to a predetermined number of mailpieces to prevent verifier misuse; and, FIG. 6 is a flow chart of the overall operation of the system to monitor revenue protection security.

Reference is now made to FIG. 5. A predetermined number of mail pieces selected for verification for a given accounting period is entered at 502. The verifier is selected and the access counter set to the predetermined number of mail pieces at 504. The access counter is decremented as mail pieces are verified at 506. A comparison is made of the access counter to determine if it is above zero at 508.

A decision is made at 512. If the access counter is greater than zero, the verification process continues at 514 and the system loops back to block 502. If the access counter is zero, the verifier is disabled at 516. The verifier may be disabled by any of a number of techniques to preclude it from continuing to operate to verify mail.

Figure 6:
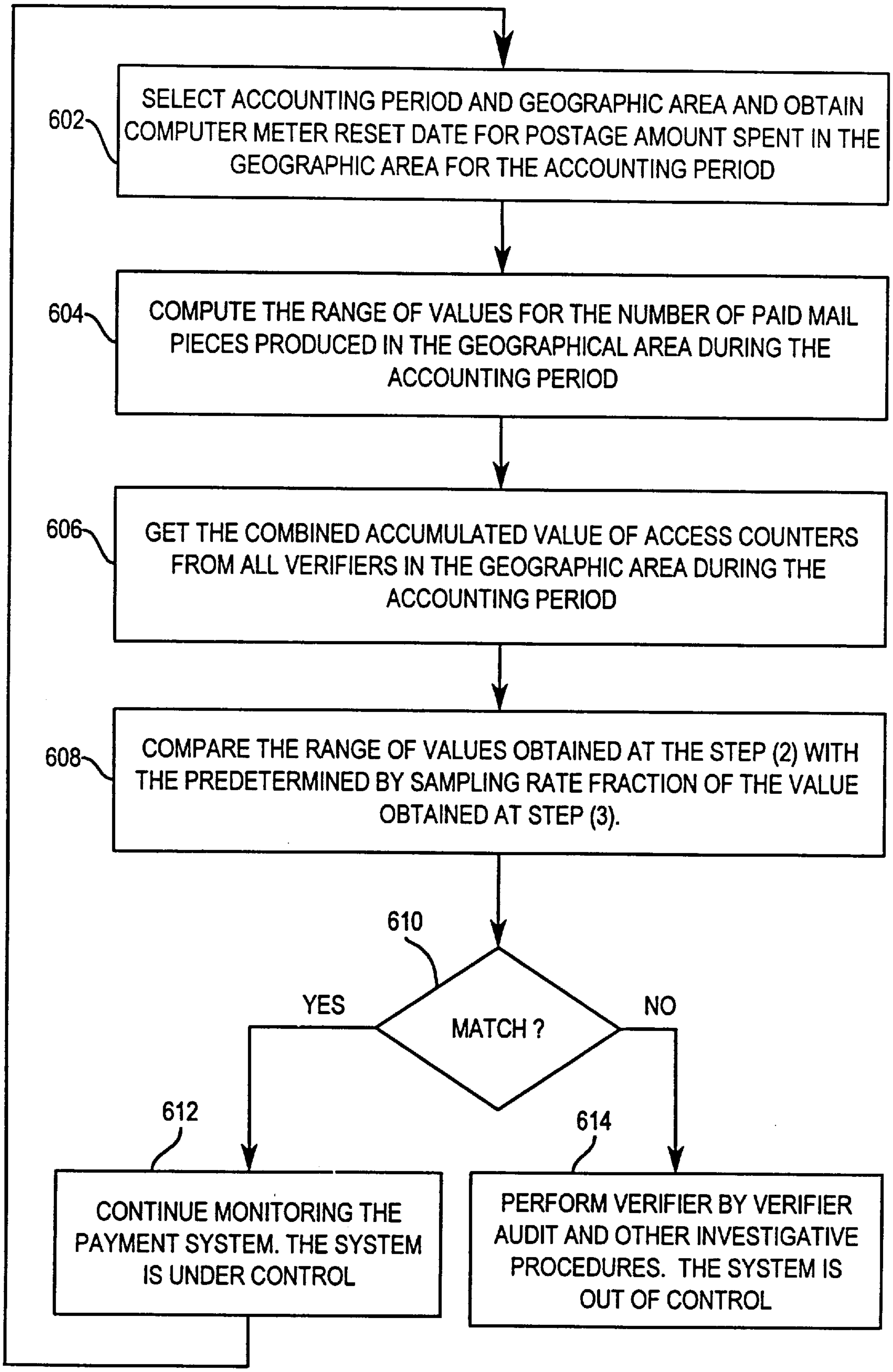

Reference is now made to FIG. 6. An accounting period and geographic area are selected and the computer meter resetting data is obtained at 602. The computer meter resetting data obtained is for the postage spent in the geographic area for the accounting period and/or the piece count which is also available in systems of this type. This allows you to estimate the number of mail pieces which have been paid for. Reference is made to U.S. Pat. No. 4,097,923 REMOTE POSTAGE METER CHARGING SYSTEM USING AN ADVANCED MICROCOMPUTERIZED POSTAGE METER, the disclosure of which is hereby incorporated by reference.

The range of values for the number of mail pieces produced in the geographical area during the accounting period are computed at 604. The combined accumulated value of the access counters for all the verifiers in the geographic area during the accounting period is obtained at 606. A comparison is made at 608 of the range of value obtained at 604 with the value obtained from the access counters at 606. A determination is made at 610 whether the range of values match with the access counter data. If the match occurs, the payment system continues monitoring the mail operation at 612 since the system is under control. That is, there is no leakage of revenue by the introduction of illegal mail pieces into the system or an unexplained shortage of mail pieces. If a match does not occur, investigative procedures are initiated at 614. This involves performing an audit of the verifiers since the system is no longer under control and a determination needs to be made as to why there are excess mail pieces in the system or a shortage of mail pieces in the system.

It should be recognized that various verifier security techniques may be employed to prevent physical removal or misuse of the verifier. For example, the verifiers may be bolted to a secure location within the verifying facility. The power can be such that when power is removed from the system, the data within the cryptographic engine is obliterated. The power supply can be physically located in such a way that unbolting of the verifier causes the power to be interrupted. While the present invention has been disclosed and described with reference to the disclosed embodiments thereof, it will be apparent, as noted above, that variations and modifications may be made therein. It is, thus, intended in the following claims to cover each variation and modification that falls within the true spirit and scope of the present invention.

What is claimed is:

1. A method where items are verified for authenticity, the method comprising the steps of:

(a) estimating an expected number of items to be processed for verification during a given period;

(b) processing items for verification;

(c) counting the number of items processed for verification during the given period;

(d) comparing said expected number of items with said number of items processed for verification; and, (e) initiating action based on said comparing step.

2. A method as defined in claim 1, further including stopping the processing of items for verification if said number of items processed for verification is not within a predetermined range of said expected number.

3. A method as defined in claim 1, further including initiating a fraud investigation if said number of items processed for verification is not within a predetermined range of said expected number of items.

4. A method as defined in claim 1, further including stopping the processing of items for verification if during the comparing step a match does not occur between said expected number of items and said number of items processed for verification.

5. A method as defined in claim 1, further including continuing the processing of items for verification if during the comparing step a match does not occur between said expected number of items and said number of items processed for verification.

6. A method as defined in claim 1, further including initiating a fraud investigation if during the comparing step a match does not occur between said expected number of items and said number of items processed for verification.

7. In a verification system having a microprocessor, a method for verifying authenticity of mail pieces, the method comprising the steps of:

(a) estimating an expected number of mail pieces selected for verification during a given period;

(b) verifying mail pieces;

(c) counting the number of mail pieces processed for verification during the given period;

(d) comparing said expected number of mail pieces with said number of processed mail pieces; and, (e) initiating action based on said comparing step.

8. A method as defined in claim 7, further including stopping the verifying of mail pieces if said number of mail pieces processed for verification is not within a predetermined range of said expected number.

9. A method as defined in claim 7, further including initiating a fraud investigation if said number of items processed for verification is not within a predetermined range of said expected number of items.

10. A method as defined in claim 7, further including stopping the verifying of mail pieces if during the comparing step a match does not occur between said expected number of mail pieces and said number of mail pieces processed for verification.

11. A verification method, the method comprising the steps of:

(a) selecting an accounting period;

(b) selecting a geographical area;

(c) estimating an expected number of items to be verified in said geographical area during said accounting period;

(d) processing items for verification in the geographical area;

(e) counting the number of items processed for verification during the accounting period; and, (f) comparing said expected number of items and said number of items processed for verification;

(g) initiating said action based upon said comparing step.

12. A method as defined in claim 11, further including stopping the processing of items for verification if said number of items processed for verification is not within a predetermined range of said expected number of items.

13. A method as defined in claim 11, further including initiating a fraud investigation if said number of items processed for verification is not within a predetermined range of said expected number of items.

14. A method as defined in claim 11, further including stopping the verification process if during the comparing step a match does not occur between said expected number of items and said number of items processed for verification.

15. A method as defined in claim 11, further including continuing the verification process if during the comparing step a match does not occur between said expected number of items and said number of items processed for verification.

16. A method as defined in claim 11, further including initiating a fraud investigation if during the comparing step a match does not occur between said expected number of items and said number of items processed for verification.

* * * * *